United States Patent [19]
Kempf et al.

[11] Patent Number: 6,059,453
[45] Date of Patent: May 9, 2000

[54] TEMPERATURE PROBE WITH SAPPHIRE THERMOWELL

[75] Inventors: Konrad Kempf, Freigericht-Bernbach; Werner Döring, Schlotfeld, both of Germany

[73] Assignee: Rosemount Inc., Eden Prairie, Minn.

[21] Appl. No.: 09/062,817

[22] Filed: Apr. 20, 1998

[51] Int. Cl.[7] .............................. G01K 1/08; G01K 1/12; G01K 7/02
[52] U.S. Cl. .................... 374/179; 374/185; 374/208; 374/139
[58] Field of Search ................................ 374/179, 185, 374/208, 139

[56] References Cited

U.S. PATENT DOCUMENTS

| | | | |
|---|---|---|---|
| 3,011,006 | 11/1961 | Nicholson et al. | 136/232 |
| 3,935,032 | 1/1976 | Brandeberry et al. | 374/179 |
| 4,060,095 | 11/1977 | Kurita | 136/234 |
| 4,721,533 | 1/1988 | Phillippi et al. | 374/208 |
| 4,721,534 | 1/1988 | Phillippi et al. | 374/179 |
| 4,776,705 | 10/1988 | Najjar et al. | 374/139 |
| 4,984,904 | 1/1991 | Nakano et al. | 374/208 |
| 5,064,295 | 11/1991 | Thill et al. | 374/208 |
| 5,069,553 | 12/1991 | Phillippi | 374/179 |
| 5,137,582 | 8/1992 | Kasman | 136/233 |
| 5,147,137 | 9/1992 | Thiesen | 374/179 |
| 5,181,779 | 1/1993 | Shia et al. | 374/179 |
| 5,209,571 | 5/1993 | Kendall | 374/208 |
| 5,242,226 | 9/1993 | Ross et al. | 374/179 |
| 5,348,395 | 9/1994 | Corr, II et al. | 374/179 |
| 5,456,761 | 10/1995 | Auger et al. | 136/232 |
| 5,520,461 | 5/1996 | Curry et al. | 374/179 |
| 5,637,802 | 6/1997 | Frick et al. | 73/724 |
| 5,662,418 | 9/1997 | Deak et al. | 374/208 |
| 5,743,646 | 4/1998 | O'Connell et al. | 374/208 |
| 5,811,761 | 9/1998 | Kita et al. | 374/208 |

FOREIGN PATENT DOCUMENTS

| | | |
|---|---|---|
| 0 454 846 A1 | 11/1991 | European Pat. Off. . |
| 41 38 460 | 11/1991 | Germany . |
| 44 31 291 A1 | 3/1996 | Germany . |
| 1-288 740 | 2/1990 | Japan . |
| 1-321 326 | 3/1990 | Japan . |

OTHER PUBLICATIONS

Samsonwo, G.W., Kisly, P.S.: "Nichtmetallene Tehrmopaare und Schutzrohre", In: VDI–Z 111, Oct. 19, 1969 (I), S.1337–1342—English Abstract.

Samsonwo, G.W., Kisly, P.S.: "Nichtmetallene Tehrmopaare und Schutzrohre", In: VDI–Z 111, Dec. 24, 1969 (II), S.1706–1712—English Abstract.

Wübbenhorst, Heinz: "Tauch–Temperaturmessungen in Metallen", In: Giesserei, 58. Jg., H.20 Oct. 1971, S.605–611—English Abstract.

*Primary Examiner*—G. Bradley Bennett
*Assistant Examiner*—G. Verbitsky
*Attorney, Agent, or Firm*—Westman, Champlin & Kelly, PA

[57] ABSTRACT

A temperature probe for measuring temperatures in a fluid contains a temperature responsive electrical element partially encased by a sapphire encasement. The sapphire encasement and the electrical element are further partially encased by a ceramic encasement that is exposed to the fluid. The ceramic encasement is permeable to certain gases to which the sapphire encasement is impermeable. A series of seals in the temperature probe prevents fluid from exiting through the temperature probe if the ceramic encasement and sapphire encasement are breached.

25 Claims, 5 Drawing Sheets

TEMPERATURE PROBE WITH SAPPHIRE THERMOWELL

BACKGROUND OF THE INVENTION

The present invention relates to sensors of the type used in the process control industry. In particular, the present invention relates to a process control temperature sensor.

The temperature of a process fluid is typically measured by a temperature sensor positioned in the fluid. Such temperature sensors typically include an electrical element, such as a thermocouple or RTD, that has an electrical characteristic indicative of the temperature.

To prevent direct contact between the sensitive electrical elements of the sensor and the high temperature environments where the sensor is used, the sensor is often mounted in a protective ceramic tube. Although such ceramic tubes prevent high temperature molten metal or liquids from attacking the thermocouple, they allow corrosive gases to enter the inside of the ceramic tube where the thermocouple is positioned. These gases tend to attack and etch away the metals of the sensor, especially platinum, which is used in thermocouples.

SUMMARY OF THE INVENTION

A temperature probe for measuring temperatures in a fluid contains a temperature responsive electrical element partially encased by a sapphire encasement. The sapphire encasement and the electrical element are further partially encased by a ceramic encasement that is exposed to the fluid. The ceramic encasement is permeable to certain gases to which the sapphire encasement is impermeable. A series of seals in the temperature probe prevents fluid from exiting through the temperature probe if the ceramic encasement and sapphire encasement are breached.

DETAILED DESCRIPTION OF THE PREFERRED EMBODIMENTS

Figure 1:
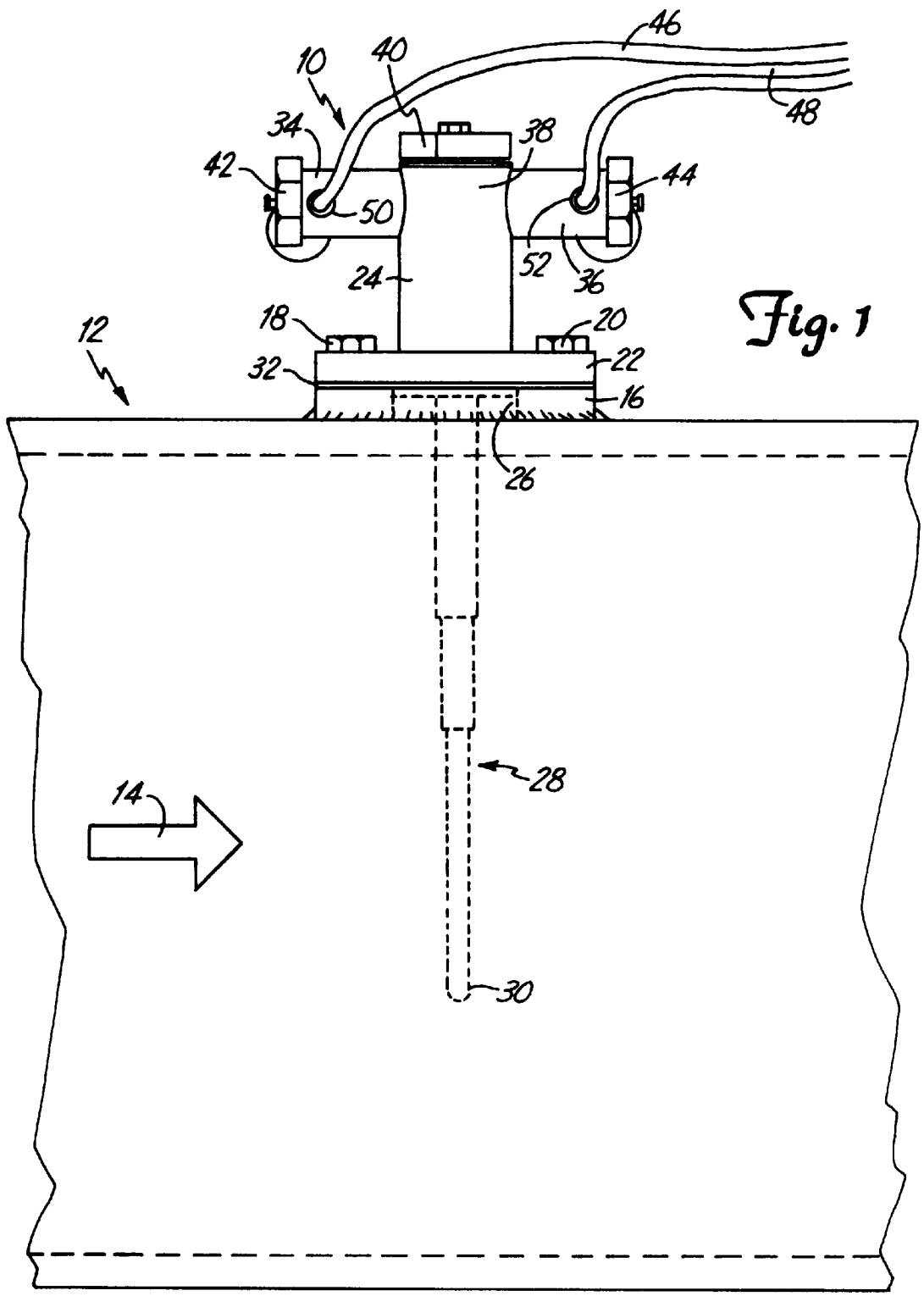
FIG. 1 is a side view of a temperature probe of the present invention inserted in a pipe.

FIG. 1 is a side view of temperature probe 10 of the present invention inserted in pipe 12, which carries a process fluid in general direction 14. Temperature probe 10 is mounted to a mounting ring 16 by bolts 18 and 20 passing through a mounting flange 22 and into mounting ring 16. A compressible ring 32 provides a seal between mounting flange 22 and mounting ring 16. Mounting ring 16 is welded to pipe 12 and mounting flange 22 is welded to a central housing 24 of temperature probe 10. Mounting ring 16 includes a through hole 26, through which a probe projection 28 passes. A temperature responsive electrical element, such as a thermocouple, is located within probe projection 28 at end 30. Although temperature probe 10 is shown mounted to a pipe that carries a process fluid, those skilled in the art will recognize that the probe may also be mounted to other types of containers holding static or moving fluids.

Two gas tubes 34 and 36 extend laterally from central housing 24. An end cap 40 seals the interior of central housing 24 and two side caps 42 and 44 seal the interior of gas tubes 34 and 36, respectively. Conductors 46 and 48 pass through apertures 50 and 52 of gas tubes 34 and 36, respectively, and carry an electrical signal that is indicative of the temperature of the process fluid in pipe 12.

Figure 2:
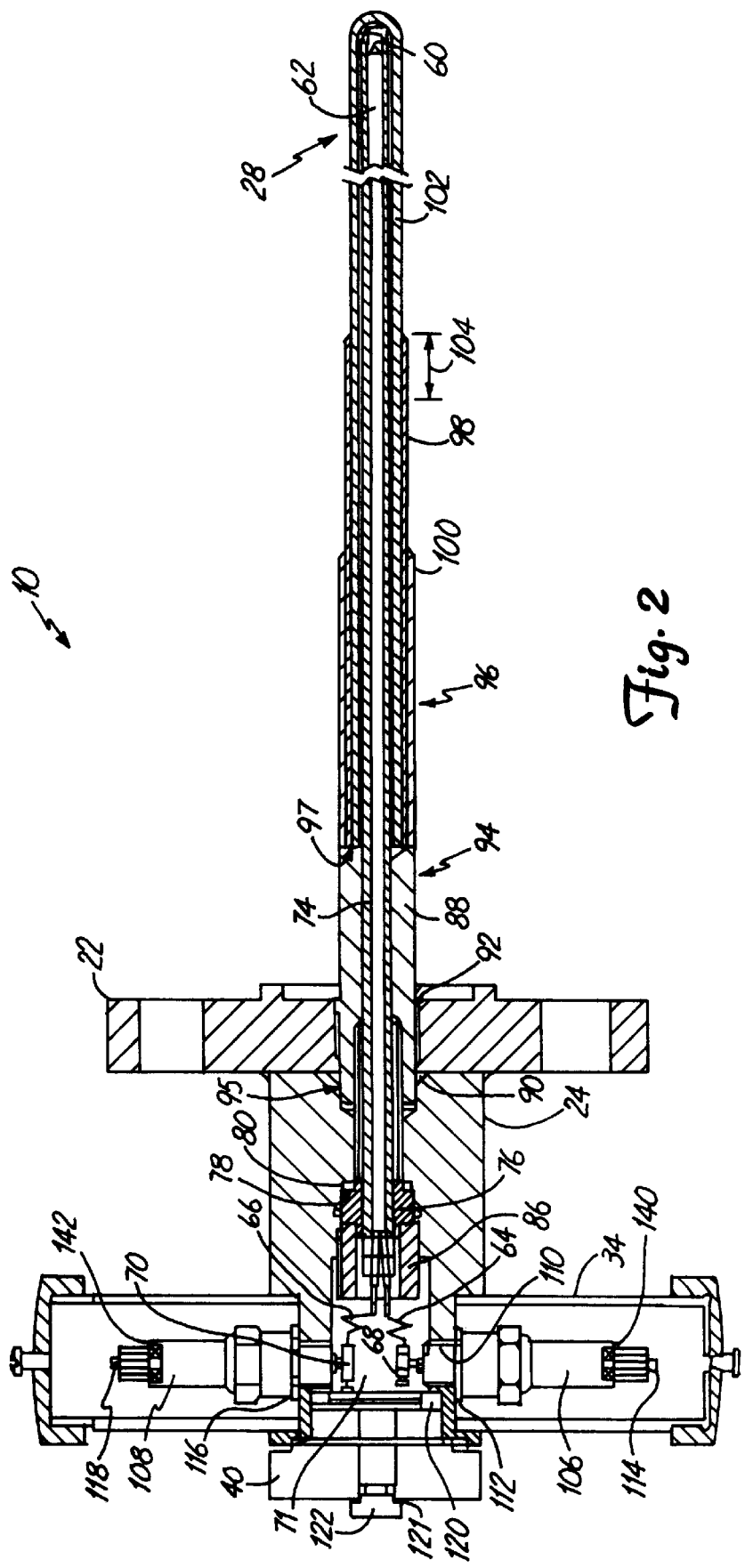
FIG. 2 is a cross-sectional view of a temperature probe of the present invention.

FIG. 2 is a cross-sectional view of temperature probe 10 of FIG. 1. Probe projection 28 includes a temperature responsive electrical element 60, which is preferably a thermocouple formed by two joined pieces of metal. Electrical element 60 is connected to two conductors 64 and 66 that are electrically and thermally isolated from each other and from the remainder of temperature probe 10 by an insulator 62, which is preferably a ceramic material. Insulator 62 extends through a central aperture in mounting flange 22 and into central housing 24, which includes a chamber 71. Chamber 71 is sealed by end cap 40, which presses a deformable copper ring 120 into the top of central housing 24. End cap 40 includes a cap port sealed by a cap screw 122, which presses against a copper ring 121. Within chamber 71, conductors 64 and 66 extend out of insulator 62 and are connected to terminals 683 and 70, respectively.

A sapphire tube 74, preferably a single piece of sapphire, extends along the length of insulator 62 in a concentric manner and forms a closed end around electrical element 60 to partially encase electrical element 60 and insulator 62. As such, sapphire tube 74 is referred to generally as a sapphire encasement. The left-most portions of sapphire tube 74 and insulator 62 are positioned within an encasement sleeve 76, which is positioned in chamber 71, and extend into the central aperture of mounting flange 22. An encasement sleeve 76 includes shoulder 78, which has a surface that faces right in FIG. 2 and that presses against a sealing ring 80. Sealing ring 80 is preferably made of copper and is positioned between shoulder 78 and a ledge formed by central housing 24. A surface of shoulder 78 of encasement sleeve 76 that faces left in FIG. 2 is engaged by threaded sleeve 86, which threadably engages central housing 24. Threaded sleeve 86 presses shoulder 78 of encasement sleeve 76 into sealing ring 80.

Sapphire tube 74 can be constructed using the "Verneull" method, which uses oxyhydrogen gas to blow the sapphire tube. Sapphire tube 74 prevents gas impurities, which can degrade the performance of electrical element 60, from reaching electrical element 60. These impurities include $H_2CO$, $H_2S$, $CO_2$, $CH_4$, $N_2$, COS, Ar, V, Ni, Fe, Si, Ca, Na, and Zn. Sapphire tube 74 thereby prevents erosion of electrical element 60 by these gases.

A flange sleeve 88 passes through the central aperture in mounting flange 22 and is welded to mounting flange 22 at annular welds 90 and 92. Flange sleeve 88 has a left portion 95, a central portion 94 and a right portion 96. A flange sleeve aperture passes through all three portions of flange sleeve 88 but has a different radius in each portion. Specifically, the radius of the aperture is smaller in central portion 94 than in left portion 95 or right portion 96.

Within central portion 94, sapphire tube 74 is next to the inner surface of flange sleeve 38. Within left portion 95, sapphire tube 74 is separated from the inner surface of flange sleeve 88 by encasement sleeve 76. Within right portion 96, the inner surface of flange sleeve 88 is separated from sapphire tube 74 by an intermediate sleeve 98, a ceramic wrap 100 and a ceramic tube 102.

The end of right portion 96 of flange sleeve 88 is welded to intermediate sleeve 98 by an annular weld. Intermediate sleeve 98 extends beyond the end of right portion 96 and is cemented to ceramic tube 102 along a length 104 at the end of intermediate sleeve 98. Preferably, intermediate sleeve 98 is cemented to ceramic tube 102 using Thermoguss 2000 cement produced by Klebchemie M. G. Becker GmbH + Co. KG of Germany. Ceramic wrap 100 fills the gap between intermediate sleeve 98 and ceramic tube 102, which gap is not otherwise filled by cement. Ceramic tube 102 and intermediate sleeve 98 both have ends that terminate at interior ledge 97 of flange sleeve 88. Interior ledge 97 arises because of the change in the radius of the flange sleeve aperture at the transition point between right portion 96 and central portion 94. Ceramic tube 102 extends in a concentric manner around sapphire tube 74 from interior ledge 97 to a closed end that surrounds the closed end of sapphire tube 74. As such, ceramic tube 102 is referred to generally as a ceramic encasement.

The signal produced by electrical element 60 is carried by conductors 64 and 66 to terminals 68 and 70, which are connected to first ends of ceramic covered electrodes 106 and 108, respectively. In preferred embodiments, ceramic covered electrodes 106 and 108 are spark plugs. Electrode 106 threadably engages portions of central housing 24 that define an aperture 110, which extends between central housing 24 and gas tube 34. Aperture 110 is sealed by electrode 106 and a copper ring 112, which acts as a first sealing ring and is compressed between electrode 106 and central housing 24. Electrode 106 has a terminal 114 on a second end that connects to conductor 46 of FIG. 1. Similarly, electrode 108 threadably engages central housing 24 through an aperture that is sealed by copper ring 116 (a first sealing ring) and electrode 108. Electrode 108 includes terminal 118 on a second end that is connected to conductor 48 of FIG. 1. O-rings 140 and 142 form second rings to seal the interiors of electrodes 106 and 108 at terminals 114 and 118, respectively.

Figure 3:
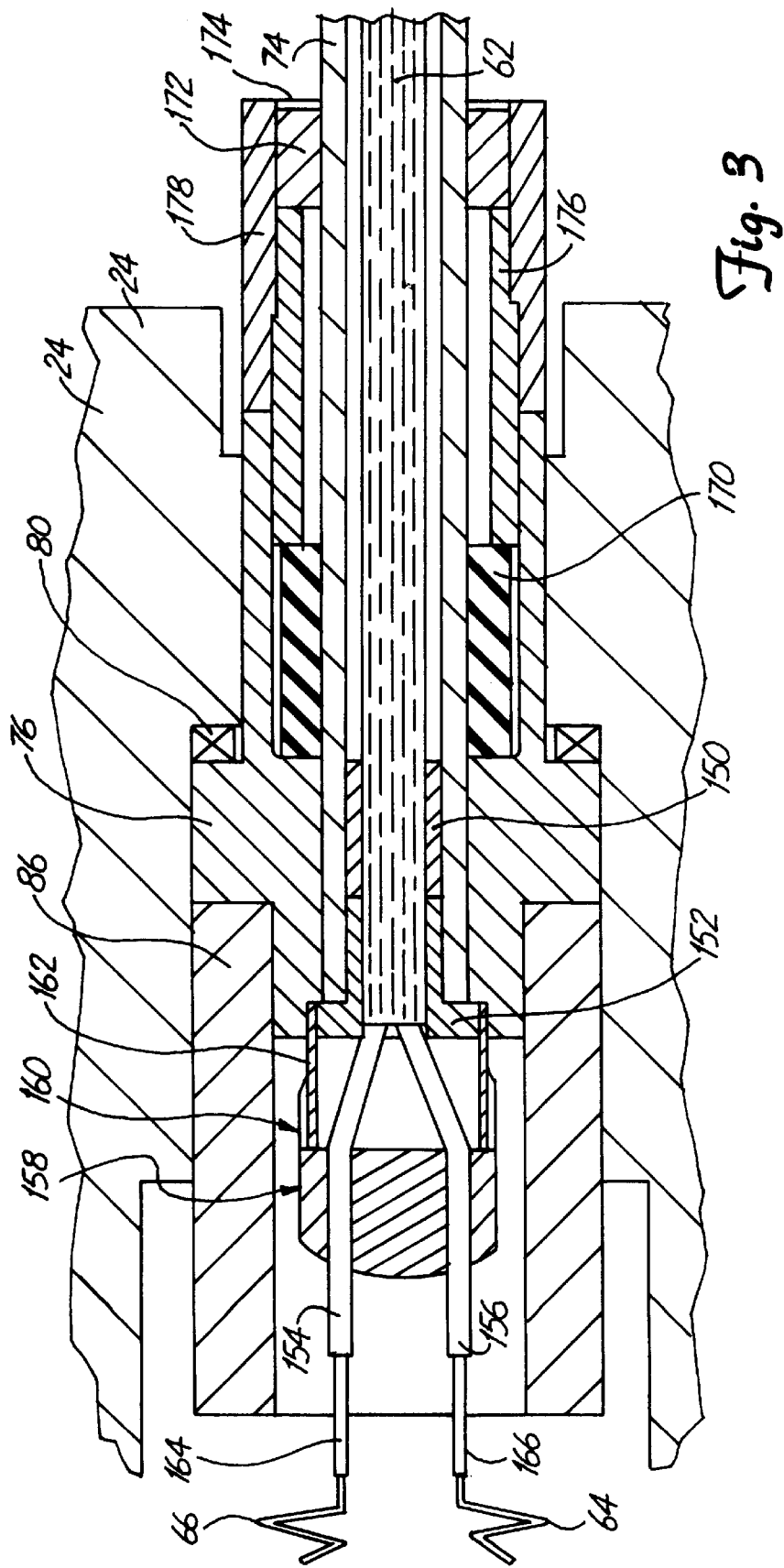
FIG. 3 is an expanded cross-sectional view of one portion of a temperature probe of the present invention.

FIG. 3 is an expanded view of the portion of temperature probe 10 near encasement sleeve 76. In FIG. 3, the connections between sapphire tube 74, insulator 62 and encasement sleeve 76, that together with conductors 64 and 66 and temperature responsive electrical element 60 form a probe insert, are shown in more detail.

Within encasement sleeve 76, insulator 62 is connected to sapphire tube 74 by ceramic material 150 near the left end of sapphire tube 74. A silicone fill material 152 covers the ends of sapphire tube 74 and insulator 62, and extends into a small gap between insula-or 62 and sapphire tube 74 near the left end of sapphire tube 74. Conductors 66 and 64 are covered by silicone insulator sheathings 154 and 156, respectively, and extend from silicone film material 152 through ceramic cap 158. Ceramic cap 158 is covered by a vacuum tight metal bushing 160, which is welded to a cylindrical sleeve 162 of stainless steel. Sleeve 162 is in turn brazed into encasement sleeve 76.

The ends of insulator sheathings 154 and 156 are brazed to produce brazed sheathings 164 and 166, respectively. Conductors 66 and 64 extend out of brazed sheathings 164 and 166, respectively.

Encasement sleeve 76 is connected to sapphire tube 74 through a compressible bushing 170, a Temperature resistent cement material 172, and a hermetic seal 174. Compressible bushing 170 is pressed against the inner wall of encasement sleeve 76 and the outer wall of sapphire tube 74 by a threaded bushing 176 that threadably engages the interior of encasement sleeve 76 and that has an edge in contact with compressible bushing 170. Threaded bushing 176 also threadably engages sleeve extension 178 that is aligned with and in contact with encasement sleeve 76. Temperature resistent cement material 172 fills the end portion of the gap between sleeve extension 178 and sapphire tube 74. Hermetic seal 174 covers temperature resistent cement material 172 between sleeve extension 178 and sapphire tube 74. In preferred embodiments, temperature resistent cement material 172 and hermetic seal 174 are constructed from Thermoguss 2000 cement. Preferably, hermetic seal 174 is constructed from Thermoguss 2000 cement coated with Retasil.

Figure 4:
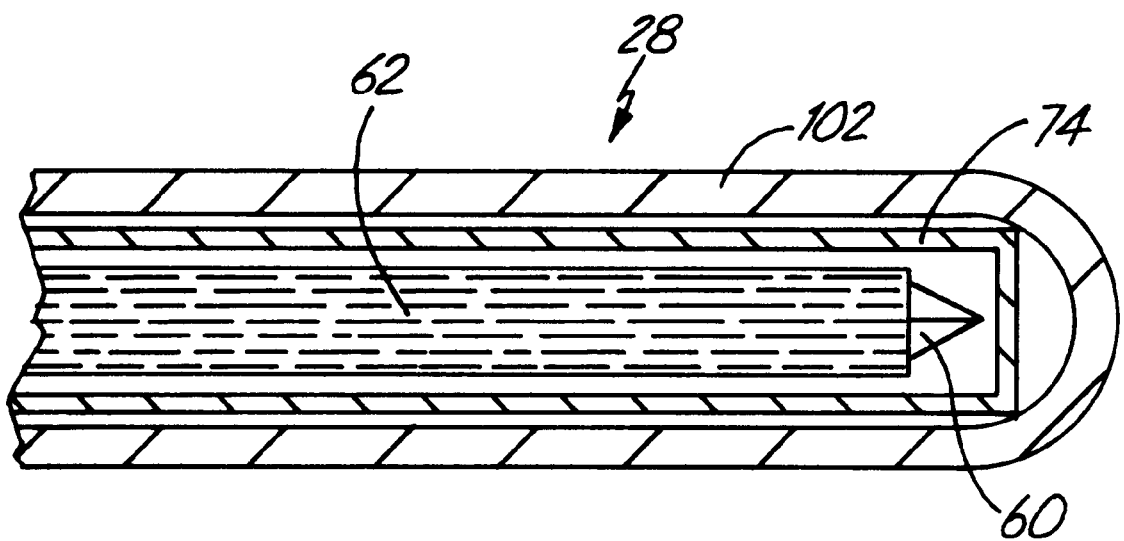
FIG. 4 is an expanded cross-sectional view of the end of a temperature probe of the present invention.

FIG. 4 is an expanded cross-sectional view of the end of probe projection 28. In FIG. 4, ceramic tube 102 encases sapphire tube 74, which in turn encases electrical element 60 and insulator 62.

The connections between the various parts of temperature probe 10 provide multiple levels of protection against fluid escaping through the temperature sensor. The levels of protection provided by temperature probe 10 are represented graphically in FIG. 5.

Figure 5:
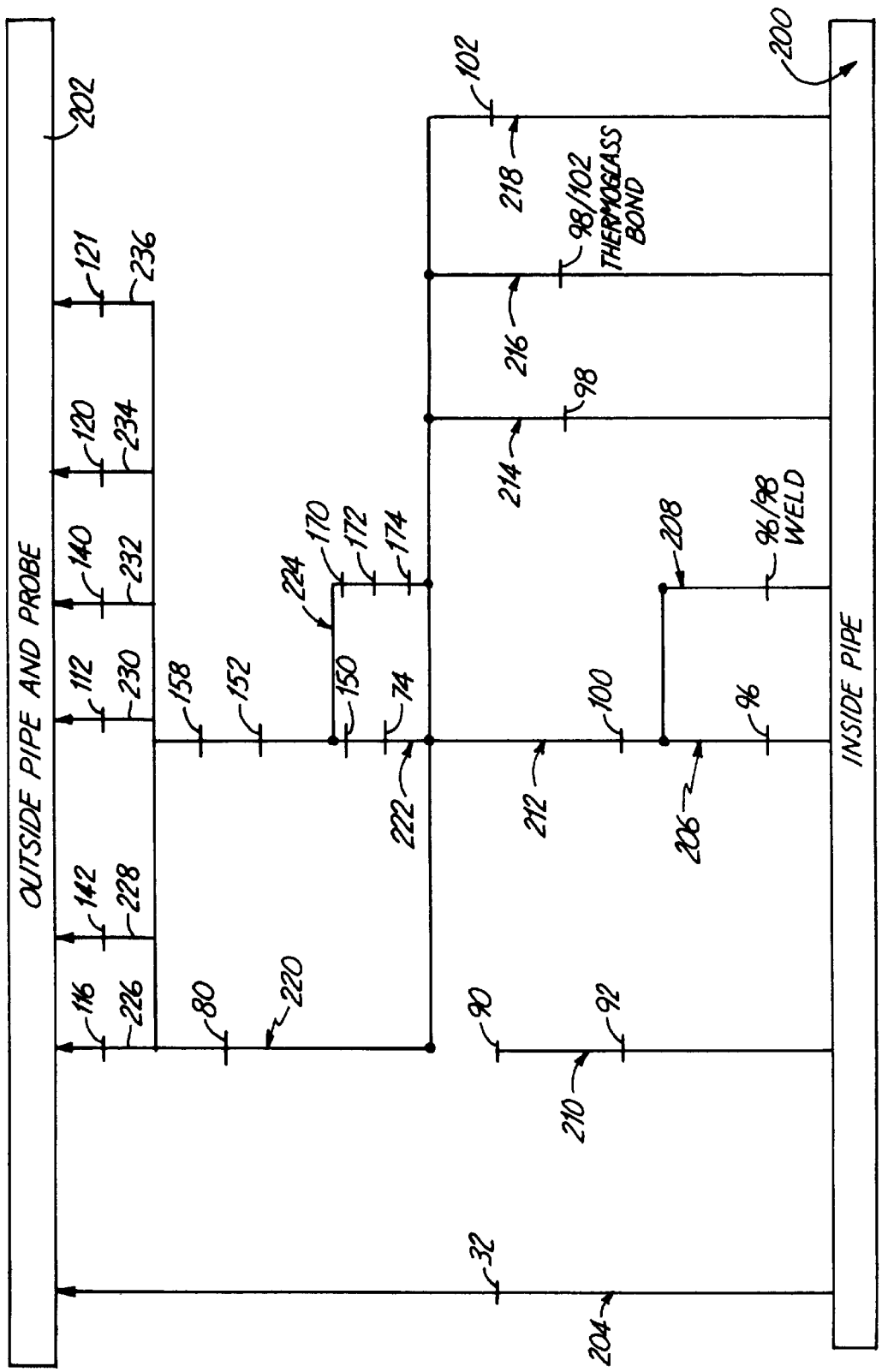
FIG. 5 is an operational diagram describing the barriers to fluid escape in the probe of the present invention.

In FIG. 5, the inside of the pipe is represented by block 200 at the bottom of the page. The atmosphere surrounding the pipe and temperature probe 10 is represented by block 202 at the top of the page. The lines between blocks 200 and 202 represent paths over which fluid from the inside of the pipe must flow in order to reach the outside of the pipe. Hash marks along the lines indicate barriers to the free flow of fluid from the inside of the pipe to the outside. Each hash mark has a number placed next to it representing an element of temperature probe 10 found in FIGS. 1–4. Hash marks that have two numbers separated by a forward slash indicate that the barrier is a junction between the two elements represented by the two numbers. For example, the hash mark referenced by "98/102" represents the bond between intermediate sleeve 98 and ceramic tube 102.

The most direct path for fluid to exit the pipe is through the space between mounting flange 22 and mounting ring 16 of FIG. 1. Fluid is prevented from following this path, denoted as path 204 in FIG. 5, by compressible ring 32 of FIG. 1.

The remaining paths from the inside of the pipe to the outside of the pipe are constructed from a series of smaller paths that intersect at common nodes within temperature probe 10.

For example, paths 210, 212, 214, 216 and 218 represent paths to the outer surfaces of encasement sleeve 76 and sapphire tube 74. To pass through path 210, fluid must breach annular welds 90 and 92, which connect flange sleeve 88 to mounting flange 22. To pass along path 212, fluid must successfully pass along paths 206 or 208 and further breach ceramic film material 100. Paths 206 and 208 represent fluid passing from the inside of the pipe to the outside of ceramic film material 100. Path 206 represents fluid passing through right portion 96 of flange sleeve 88. This could occur if flange sleeve 88 develops a crack in this region. Path 208 represents a path between flange sleeve 88 and intermediate sleeve 98. This path will only be traversed by the fluid if the weld between flange sleeve 88 and intermediate sleeve 98 fails.

Path 214 represents a breach in intermediate sleeve 98. Path 216 represents a breach in the cement bond between intermediate sleeve 98 and ceramic tube 102. Path 218 represents a breach of ceramic tube 102, for example, a crack in ceramic tube 102.

Even if fluid reaches the outside of sapphire tube 74 or the outside of encasement sleeve 76, the fluid is prevented from entering chamber 71 by obstacles in three separate paths.

The first path into chamber 71 is path 220, which is blocked by sealing ring 80. The second path, path 222, is blocked by sapphire tube 74, ceramic material 150, silicone film material 152, and ceramic cap 158. The third path, path 224, is blocked by hermetic seal 174, temperature resistent cement material 172, compressible bushing 170, silicone film material 152, and ceramic cap 158.

From chamber 71, there are six paths, 226, 228, 230, 232, 234 and 236 through which fluid can escape to the outside of the pipe. Each of these paths is blocked by either a copper ring or an O-ring. Specifically, paths 226, 228, 230, 232, 234 and 236 are blocked by copper ring 116, O-ring 142, copper ring 112, O-ring 140, copper ring 120 and copper ring 121, respectively.

The multiple levels of obstructions between the fluid in the pipe and the atmosphere outside of the pipe provide added protection against the escape of fluid from the pipe. In particular, sealing ring 80, in parallel with ceramic cap 158 and silicone film material 152 provide a first layer of protection against the escape of fluid due to the destruction of both ceramic tube 102 and the sapphire tube 74. Copper rings 116, 112, 120, 121, and O-rings 142 and 140 provide a second level of protection against fluid leakage due to a breach of ceramic tube 102 and sapphire tube 74.

The present invention is well suited to high temperature and pressure environments, for example, it can operate in an environment of 1400 degrees Celsius and 55 bars. It is also well suited for being used with fluids commonly found in oil-gasifier plants, since it's sapphire tube prevents dangerous gases from penetrating the inner space near the thermocouple. This extends the life of the thermocouple. Although it is well. suited to these particular environments, the present invention can be used in many other environments. In addition, its construction characteristics allow it to be handled by users without the need for special instructions.

Although the present invention has been described with reference to preferred embodiments, workers skilled in the art will recognize that changes may be made in form and detail without departing from the spirit and scope of the invention. For example, any type of temperature sensing element may be used.

What is claimed is:

1. A temperature probe for determining the temperature of a fluid, the temperature probe comprising:
    a temperature responsive electrical element;
    a sapphire encasement, at least partially encasing the electrical element; and
    a ceramic encasement, at least partially encasing the sapphire encasement and the electrical element.

2. The temperature probe of claim 1 wherein the ceramic encasement is permeable to a gas impurity and the sapphire encasement is impermeable to the gas impurity.

3. The temperature probe of claim 1 wherein the sapphire encasement comprises a tube having a closed end proximate the electrical element and an open end distant from the electrical element.

4. The temperature probe of claim 3 wherein conductors coupled to the thermocouple pass through the open end of the sapphire encasement.

5. The temperature probe of claim 2 wherein the ceramic encasement comprises a tube having a closed end proximate the closed end of the sapphire encasement.

6. The temperature probe of claim 3 further comprising an encasement sleeve sealingly connected to the sapphire encasement, the open end of the sapphire encasement being located within the encasement sleeve.

7. The temperature probe of claim 6 further comprising a housing, the encasement sleeve sealingly connected to the housing.

8. The temperature probe of claim 6 wherein the encasement sleeve is connected to the sapphire encasement through a cement bond.

9. The temperature probe of claim 7 wherein the open end of the sapphire encasement is sealed with a fill material.

10. The temperature probe of claim 9 wherein the open end of the sapphire encasement is further sealed by a ceramic cap.

11. The temperature probe of claim 10 further comprising an electrode having a first end and a second end, the first end connected to conductors coupled to the electrical element and the second end connected to conductors extending from the temperature probe.

12. The temperature probe of claim 11 wherein a portion of the electrode resides in the housing and a portion of the electrode resides in a tube connected to the housing.

13. The temperature probe of claim 12 wherein a first sealing ring cooperates with the electrode to seal the interior of the housing from the interior of the tube.

14. The temperature probe of claim 13 wherein a second sealing ring that is internal to the electrode cooperates with the electrode to seal the interior of the housing from the interior of the tube.

15. The temperature probe of claim 7 further comprising an end cap capable of being connected to and removed from the housing and an end cap sealing ring, the end cap, the end cap sealing ring and the housing cooperating to seal the interior of the housing from the exterior of the temperature probe.

16. A probe for measuring a parameter of a fluid, the probe comprising:
    a measuring element;
    a first protective element, having a closed end and an open end; and
    a second protective element having a closed end and an open end, the second protective element being located within the first protective element, the measuring element being located within the second protective element wherein the second protective element comprises sapphire.

17. The probe of claim 16 wherein the measuring element comprises a thermocouple.

18. The probe of claim 16 wherein the first protective element is permeable to a corrosive gas and the second protective element is impermeable to the corrosive gas.

19. The probe of claim 16 further comprising a conductor coupled to the measuring element and extending out of the open ends of the first and second protective elements.

20. The probe of claim 16 further comprising a sleeve, the open end of the second protective element located within the sleeve and the sleeve bonded to the second protective element such that fluid cannot pass within a space located between the sleeve and the second protective element.

21. The probe of claim 20 further comprising a sealing ring and a housing with a chamber, a portion of the sleeve located within the chamber, the sealing ring positioned between the sleeve and the housing such that fluid is prevented from passing into the chamber.

22. The probe of claim 21 further comprising an electrode and an electrode sealing ring, a first portion of the electrode located within the chamber and a second portion of the electrode located outside of the chamber, the electrode sealing ring position between the electrode and the housing such that fluid is prevented from passing from the chamber.

23. The probe of claim 21 wherein the housing comprises an end cap aperture and the probe further comprises an end cap and an end cap sealing ring positioned relative to the housing so as to prevent fluid from passing through the end cap aperture.

24. A temperature probe insert for insertion into a protective sleeve having one closed end, the temperature probe insert comprising:

a temperature responsive element; and a protective conduit having a closed end and an open end, the temperature responsive element positioned proximate the closed end, the protective conduit comprising sapphire.

25. The temperature probe insert of claim 24 wherein the protective sleeve is permeable to a gas molecule and the protective conduit is impermeable to the gas molecule.

* * * * *